United States Patent [19]

Yasuhara

[11] 4,367,716
[45] Jan. 11, 1983

[54] FUEL INJECTION TIMING CONTROL SYSTEM

[75] Inventor: Seishi Yasuhara, Yokosuka, Japan

[73] Assignee: Nissan Motor Company, Limited, Yokohama, Japan

[21] Appl. No.: 192,368

[22] Filed: Sep. 30, 1980

[30] Foreign Application Priority Data

Oct. 4, 1979 [JP] Japan ................ 54-128159

[51] Int. Cl.³ .................................. F02M 51/00
[52] U.S. Cl. ............................ 123/478; 123/501
[58] Field of Search ........... 123/501, 502, 478, 486, 123/487

[56] References Cited

U.S. PATENT DOCUMENTS 4,265,200 5/1981 Wessel et al. ................ 123/501

Primary Examiner—Tony M. Argenbright
Attorney, Agent, or Firm—Schwartz, Jeffery, Schwaab, Mack, Blumenthal & Koch

[57] ABSTRACT

A fuel-injection timing control system is disclosed for use in an internal combustion engine. The system includes a computer responsive to various conditions of the engine that are sensed during its operation for determining an optimum fuel-injection timing value. Control means is provided which is manually operable for providing a control signal. The computer is responsive to the control signal from the control means for retarding the fuel-injection timing a predetermined value from the determined optimum fuel-injection timing value.

8 Claims, 5 Drawing Figures

FUEL INJECTION TIMING CONTROL SYSTEM

BACKGROUND OF THE INVENTION

1. Field of the Invention

This invention relates to an electronic controlled fuel injection system for use in an internal combustion engine and, more particularly, to a system including a fuel-injection timing control device for determining an optimum fuel-injection timing based upon various conditions of the engine that are sensed during its operation.

2. Description of the Prior Art

Fuel-injection timing control devices have already proposed which include a computer responsive to various engine operating conditions for determining an optimum fuel-injection timing so as to simultaneously satisfy high fuel economy, low engine noise, and low exhaust gas emission requirements. However, it is often required that the low engine noise requirement has priority over the high fuel economy requirement, for example, when the vehicle is garaged at night. The engine noise can be reduced to some extent by retarding the fuel-injection timing after the engine is warmed up.

The present invention provides a fuel-injection timing control system including control means manually operable for retarding the fuel-injection timing a predetermined value from the optimum fuel-injection timing value determined based upon various engine operating conditions.

SUMMARY OF THE INVENTION

The present invention provides a fuel-injection timing control system for use in an internal combustion engine. The system includes a computer responsive to various conditions of the engine that are sensed during its operation for determining an optimum fuel-injection timing value. Control means are provided which are manually operable for providing a control signal. The control means may comprise a voltage source, and switch means manually operable for connecting the voltage source to the computer. Preferably, the switch means is in the form of a multiposition switch for changing the voltage applied to the computer according to the position of the multi-position switch. Alternatively, the switch means may comprises a one-touch push-button switch connected between the voltage source and the computer, and a self-holding relay having a relay switch connected in parallel with the push-button switch and a relay coil energized to close the relay switch during the closing of the push-button switch.

According to the present invention, the computer is responsive to the control signal from the control means for retarding the fuel-injection timing a predetermined value from the determined optimum fuel-injection timing value. It is preferable to provide means for indicating a fuel-injection timing retarding mode of operation of the computer during the operation of the switch means.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The details as well as the other features and advantages of this invention are set forth below and are shown in the accompanying drawings, in which like reference characters refer to the same or corresponding parts, and wherein.

DESCRIPTION OF THE PREFERRED EMBODIMENT

Figure 1:
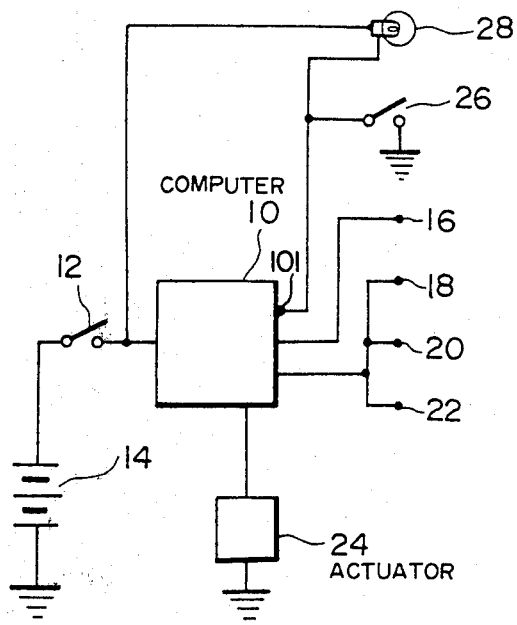
FIG. 1 is a circuit diagram showing one embodiment of a fuel-injection timing control system constructed in accordance with the present invention.

Referring first to FIG. 1, the reference numeral 10 designates a computer powered through an engine key switch 12 by a battery 14. The digital computer 10 has inputs from various sensors such as a fuel-injection timing sensor 16, an engine speed sensor 18, an engine load sensor 20, and an engine coolant temperature sensor 22 for determining an optimum fuel-injection timing value based on various conditions of the engine that are sensed during its operation. The computer 10 provides a control signal corresponding to the determined fuel-injection timing value to an actuator 24 which thereby controls the timing of fuel injection.

The computer 10 has a control input 101 connected through a selection switch 26 to ground and also through a pilot lamp 28 and the engine key switch 12 to the battery 14. When the selection switch 26 is closed, the voltage at the commputer control input 101 changes to the ground level and at the same time the pilot lamp 28 lights.

The operation is as follows: The selection switch 26 is normally held open to allow the computer 10 to determine an optimum fuel-injection timing value based on the sensed engine operating conditions and the actuator 24 to control fuel injection at a timing corresponding to the determined fuel-injection timing value.

If it is desirable to run the engine with reduced engine noise, the selection switch 26 may be turned on to connect the computer input 101 to ground and change the voltage at the computer control input 101 to the ground potential. This causes the computer 10 to retard the fuel-injection timing a predetermined value from the determined optimum fuel-injection timing value, which results in an engine noise reduction. In this state of the circuit, the pilot lamp 28 lights to provide a light indication of a fuel injection timing retarding mode of operation of the computer 10.

To return the computer operation to its normal mode from the fuel-injection timing retarding mode, the selection switch 26 may be turned off to disconnect the computer control input 101 from ground.

Figure 2:
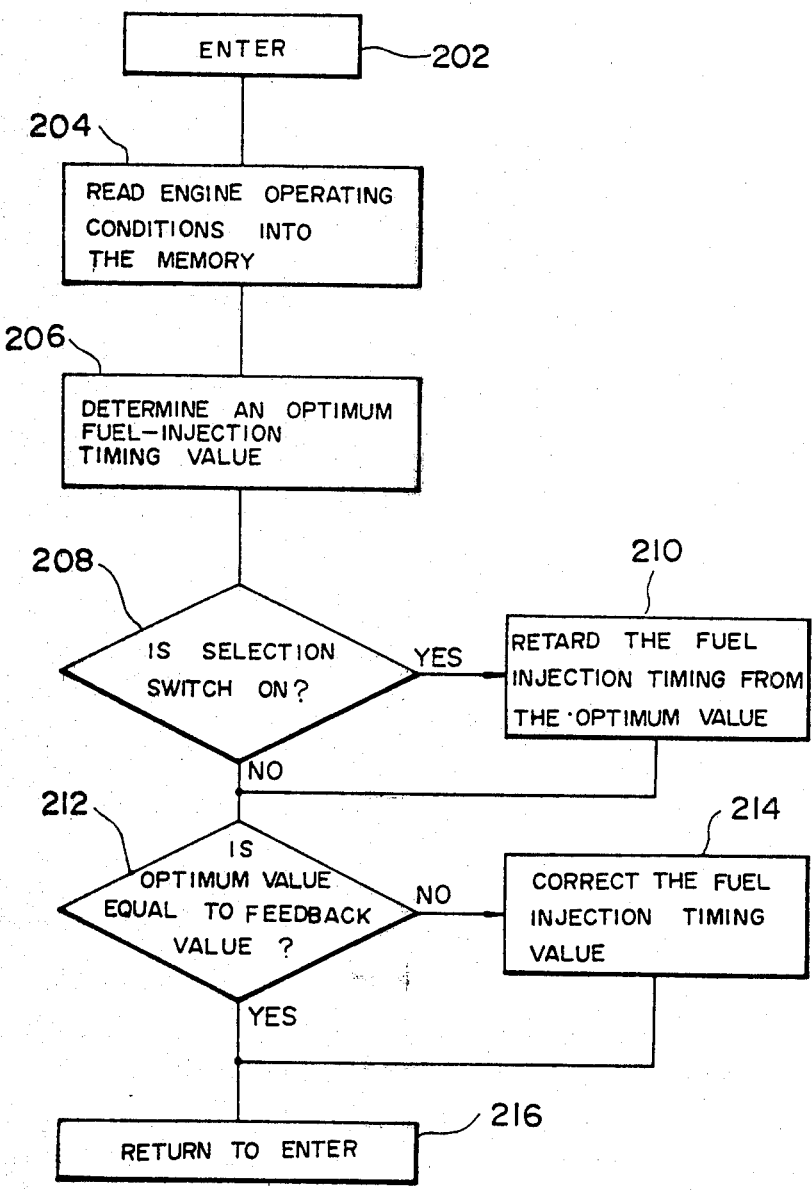
FIG. 2 is a flow diagram illustrative of the operation of the computer used in the system of FIG. 1.

FIG. 2 is a flow diagram of the programming of the computer 10. The computer program is entered at point 202. At point 204 in the program, the computer 10 reads fuel-injection timing, engine speed, engine load, engine coolant temperature, and other engine operating conditions into the computer memory. At point 206 in the program, the computer 10 determines an optimum fuel-injection timing value based upon the sensed engine operating conditions.

At the point 208, a determination is made as to whether or not the selection switch is closed. If the answer to this question is Yes, the program proceeds to a point 210 where the computer 10 retards the fuel-injection timing a predetermined value from the determined optimum fuel-injection timing value, and then the program proceeds to a point 212. If the answer to the question is No at the point 208, the program proceeds directly to the point 212.

At the point 212 in the program, a determination is made as to whether or not the fuel-injection timing fed back to the computer 10 from the fuel-injection timing sensor is equal to the fuel-injection timing value determined and/or retarded. If the answer to this question is No, the program proceeds to a point 214 where the fuel-injection timing value is corrected and then to a point 216. If the answer to the question at the point 212 is Yes, the program proceeds directly to the point 216.

At the point 216 in the program, the computer returns to the entry point 210 to await the next receipt of sensed engine operating conditions.

Figure 3:
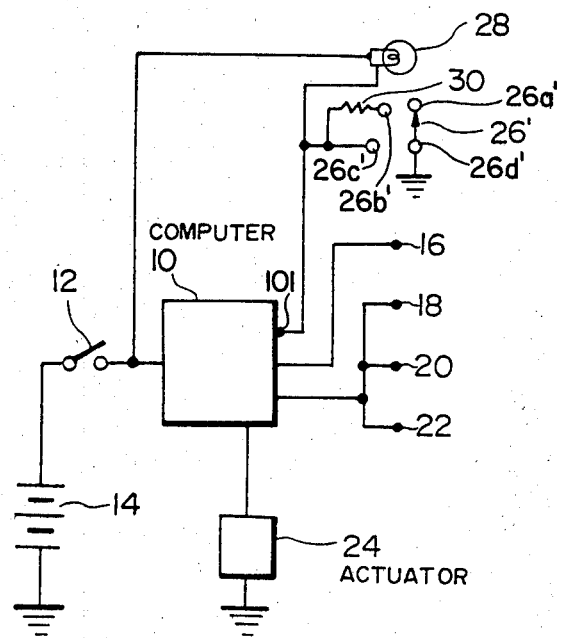
FIG. 3 is a circuit diagram showing a modified form of the system of FIG. 1.

Referring to FIG. 3, a modified form of the selection switch is shown wherein a three-position switch 26' is employed. The three-position switch 26' has three fixed contacts 26a', 26b' and 26c'. The contact 26a' is an OFF contact, the contact 26b' is connected through a resistor 30 to the computer control input 101, and the contact 26c' is connected directly to the computer control input 101. The movable contact 26d' of the three-position switch 26' is connected to ground.

The voltage at the computer control input 101 and the brightness of the pilot lamp 28 are changed according to the position of the three-position switch 26'. This is utilized to permit the computer 10 to retard the fuel-injection timing in two steps from the optimum fuel-injection timing value determined based upon the sensed engine operating conditions. While a three-position switch is illustrated in FIG. 3, it is understood that the invention contemplates use with any multi-position switch.

Figure 4:
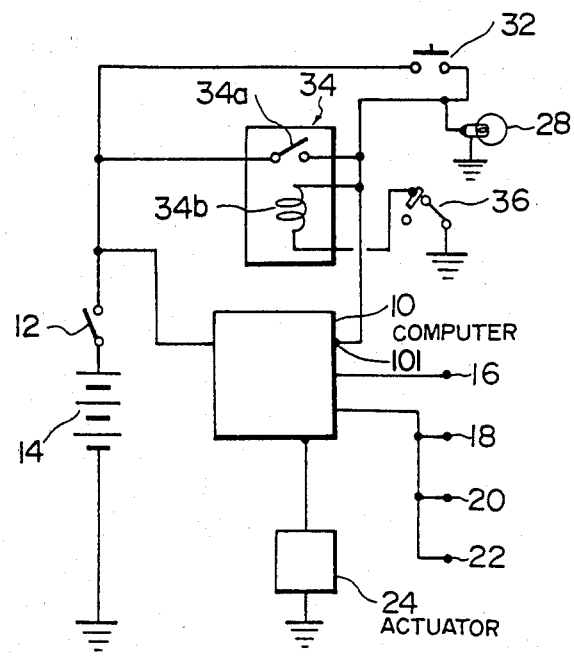
FIG. 4 is a circuit diagram showing a second embodiment of the present invention.

Referring to FIG. 4, there is illustrated a second embodiment of the present invention wherein the selection switch is in the form of the combination of a one-touch switch 32 and a self-holding relay 34. The one-touch switch 32 is connected in series with the engine key switch 12. The self-holding relay 34 has a relay switch 34a connected in parallel with the one-touch switch 32 and a relay coil 34b for closing the relay switch 34a when energized. The relay coil 34 has its one end connected to the computer control input 101, the other end thereof being connected to ground through an accelerator pedal switch 36. The accelerator pedal switch 36 is normally conductive and becomes non-conductive when the accelerator pedal is depressed an amount larger than a predetermined value. The pilot lamp 28 is shown as connected between the computer control input 101 and ground. The pilot lamp 28 lights whenever the computer control input 101 is connected to the battery 14.

The compute control input 101 is normally held at ground potential. To retard the fuel-injection timing a predetermined value from the optimum fuel-injection timing value determined based upon the sensed engine operating conditions, the one-touch push button switch 32 may be depressed to apply a battery voltage to the computer control input 101. This also energizes the relay coil 34b to close the relay switch 34a, thereby holding the computer control input 101 applied with the battery voltage after the push button switch 32 returns to its open position. This state of the circuit is maintained until the accelerator pedal is depressed an amount above the predetermined value or the power switch 12 is turned off. The accelerator pedal would not be depressed such a large amount while the need arises to retard the fuel-injection timing so as to run the engine with reduced noise. If the accelerator pedal is depressed a large amount and the computer control input 101 is disconnected from the battery 14 during a fuel-injection timing retarding mode, the computer operation can be returned to its fuel-injection timing retarding mode merely by pushing the push button switch 32 again.

With this embodiment, the computer control input 101 is disconnected from the battery 14 when the accelerator pedal is depressed above a predetermined amount or the engine key switch 12 is turned off. This eliminates such a possibility that the engine runs with the selection switch forgotten to be turned off, resulting in a fuel economy penalty.

Figure 5:
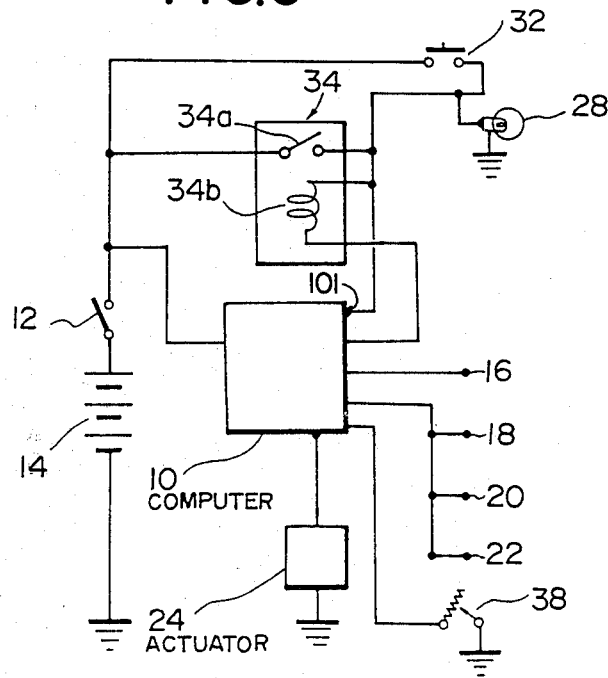
FIG. 5 is a circuit diagram showing a modified form of the system of FIG. 4.

Referring to FIG. 5, there is illustrated a modified form of the second embodiment of FIG. 4 wherein the other end of the delay coil 34b is grounded through the computer 10 and the computer 10 has an input from an accelerator pedal position sensor 38. The computer 10 is adapted to disconnect the relay coil 34b from ground when the accelerator pedal is depressed above a predetermined amount. The operation of this modification is the same as described in connection with the second embodiment of FIG. 4.

It is apparent from the foregoing that the present invention allows an operator to retard the fuel-injection timing a predetermined value from the optimum fuel-injection timing value determined based upon various engine operating conditions so as to run the engine with reduced noise by a simple operation.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

These embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fuel injection timing control system for use in an internal combustion engine having an accelerator pedal, said system including a computer responsive to various conditions of said engine for determining an optimum value of fuel-injection timing, manually operable control means for providing a control signal, and first switch means for disconnecting said control signal if said accelerator pedal is depressed more than a predetermined amount, and said computer being responsive to the control signal from said control means for retarding the fuel-injection timing a predetermined value with respect to said optimum value of fuel injection timing.

2. A fuel-injection timing control system according to claim 1, wherein said control means comprises a voltage source, and second switch means manually operable for connecting said voltage source to said computer.

3. A fuel-injection timing control system according to claim 2, wherein said second switch means comprises a multi-position switch for changing the voltage applied to said computer according to the position of said multi-position switch.

4. A fuel-injection timing control system according to claim 2, wherein said second switch means comprises a one-touch push-button switch connected between said voltage source and said computer, and a self-holding relay having a relay switch connected in parallel with said push-button switch and a relay coil energized to close said relay switch during the closing of said push-button switch.

5. A fuel-injection timing control system according to claim 4, wherein said first switch means further comprises an accelerator pedal switch associated with said accelerator pedal for deenergizing said relay coil when said accelerator pedal is depressed more than said predetermined amount.

6. A fuel-injection timing control system according to claim 4, wherein said first switch means further comprises an accelerator pedal position sensor associated with said accelerator pedal for providing a signal corresponding to the accelerator pedal position, and said computer being responsive to the accelerator pedal position indicative signal for deenergizing said relay coil when said accelerator pedal is depressed more than the predetermined amount.

7. A fuel-injection timing control system according to claim 2, comprising means for providing an indication of a fuel-injection timing retarding mode of operation of said computer during the operation of said second switch means.

8. A fuel-injection timing control system according to claim 7, wherein said indication means comprises a pilot lamp connected to said voltage source through said second switch means.

* * * * *